(12) United States Patent
Matthews et al.

(10) Patent No.: US 9,148,463 B2
(45) Date of Patent: Sep. 29, 2015

(54) METHODS AND SYSTEMS FOR IMPROVING ERROR RESILIENCE IN VIDEO DELIVERY

(71) Applicant: Alcatel-Lucent USA Inc., Murray Hill, NJ (US)

(72) Inventors: Kim N. Matthews, Warren, NJ (US); Paul A. Wilford, Bernardsville, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 87 days.

(21) Appl. No.: 14/143,607

(22) Filed: Dec. 30, 2013

(65) Prior Publication Data

US 2015/0188972 A1 Jul. 2, 2015

(51) Int. Cl.
*H04N 7/15* (2006.01)
*H04L 29/06* (2006.01)
*H04L 1/20* (2006.01)

(52) U.S. Cl.
CPC ............... *H04L 65/604* (2013.01); *H04L 1/20* (2013.01); *H04L 65/403* (2013.01); *H04L 65/607* (2013.01); *H04N 7/15* (2013.01)

(58) Field of Classification Search
CPC ............ H04N 7/15; H04N 7/14; H04N 7/142
USPC .......... 348/14.01–14.16; 275/240.01, 240.16, 275/240.27; 382/238
See application file for complete search history.

(56) References Cited

U.S. PATENT DOCUMENTS

| | | | |
|---|---|---|---|
| 8,559,527 B2 * | 10/2013 | Hamada et al. | 375/240.27 |
| 2002/0080873 A1 * | 6/2002 | Yoo | 375/240.01 |
| 2013/0259140 A1 * | 10/2013 | Stopler | 375/240.27 |

OTHER PUBLICATIONS

Cao, Zhimin et al, "Face Recognition with Learning-based Descriptor", Computer Vision and Pattern Recognition (CVPR), 2010 IEEE Conference on, Jun. 2010, p. 2707-2714, San Francisco, CA.
Shotton, Jamie et al, "Real-Time Human Pose Recognition in Parts form Single Depth Images." Communications of the ACM, Jan. 2013, p. 116-124, vol. 56, Issue 1, New York, NY.

* cited by examiner

*Primary Examiner* — Melur Ramakrishnaiah
(74) *Attorney, Agent, or Firm* — Harness, Dickey & Pierce, P.L.C.

(57) ABSTRACT

A multimedia transceiver apparatus continuously generates a model of a video scene, and then uses the generated model to estimate missing sections (e.g., image frames) of the video stream by morphing and/or modifying available uncorrupted video data based on the model. By estimating the missing sections, the subjective quality of video under error conditions (e.g., image frame loss, image frame corruption, video signal interruption, etc.) is improved.

20 Claims, 4 Drawing Sheets

METHODS AND SYSTEMS FOR IMPROVING ERROR RESILIENCE IN VIDEO DELIVERY

BACKGROUND

In a multimedia conferencing scenario, one or more cameras coupled to a computing device (e.g., as a personal computer (PC)), transmit real-time visual information, such as compressed video data, over a computer network. When compressed video data is corrupted, for example due to network impairments, storage failure, source loss, etc., the decoding process at the receiver is interrupted. Because of the predictive nature of most video encoders, this interruption may last for multiple (e.g., many) frames until synchronization is reacquired. During this time, conventional "frame repeat" decoders typically repeat the last successfully decoded frame resulting in obvious and annoying jerkiness and pauses (or freezes) to the user at the receiver.

SUMMARY

At least one example embodiment provides a multimedia transceiver apparatus. According to at least this example embodiment, the multimedia transceiver apparatus includes: a frame prediction circuit; a signal loss detector; and an output selector. The frame prediction circuit is configured to: generate a parameterized model description for each of a plurality of image frames in a sequence of image frames of a video scene, the plurality of image frames including at least a current image frame and a previous image frame, and the parameterized model description including position and orientation information for objects in an image frame; predict a parameterized model description for a subsequent image frame in the sequence of image frames based on the parameterized model descriptions for the plurality of image frames; and estimate the subsequent image frame based on the current image frame and the predicted parameterized model description for the subsequent image frame. The signal loss detector is configured to detect an interruption in a received video signal. The output selector is configured to output the estimated subsequent image frame in response to the detected interruption in the received video signal.

At least one other example embodiment provides a multimedia delivery apparatus. According to at least this example embodiment, the multimedia delivery apparatus includes: a model creation circuit configured to generate a parameterized model description for a current image frame in a sequence of image frames of a video scene, the parameterized model description including position and orientation information for objects in the current image frame; an encoder configured to encode the current image frame for transmission; and a transmitter configured to transmit the encoded current image frame and the parameterized model description for the current image frame.

At least one other example embodiment provides a multimedia transceiver apparatus. According to at least this example embodiment, the multimedia transceiver apparatus includes: an image frame estimation circuit; a signal loss detector; and an output selector. The image frame estimation circuit is configured to: receive a parameterized model description for a current image frame in a sequence of image frames of a video scene, the parameterized model description including position and orientation information for objects in the current image frame; and estimate the current image frame based on a previous image frame and the received parameterized model description for the current image frame. The signal loss detector is configured to detect interruption in a received video signal. The output selector is configured to output the estimated current image frame in response to the detected interruption in the received video signal.

At least one other example embodiment provides a video delivery method including: generating a parameterized model description for each of a plurality of image frames in a sequence of image frames of a video scene, the plurality of image frames including at least a current image frame and a previous image frame, and the parameterized model description including position and orientation information for objects in an image frame; predicting a parameterized model description for a subsequent image frame in the sequence of image frames based on the parameterized model descriptions for the plurality of image frames; estimating the subsequent image frame based on the current image frame and the predicted parameterized model description for the subsequent image frame; detecting an interruption in a received video signal; and outputting the estimated subsequent image frame in response to the detected interruption in the received video signal.

At least one other example embodiment provides a video delivery method including: generating a parameterized model description for a current image frame in a sequence of image frames of a video scene, the parameterized model description including position and orientation information for objects in the current image frame; encoding the current image frame for transmission; and transmitting the encoded current image frame and the parameterized model description for the current image frame.

At least one other example embodiment provides a video delivery method including: receiving a parameterized model description for a current image frame in a sequence of image frames of a video scene, the parameterized model description including position and orientation information for objects in the current image frame; estimating the current image frame based on a previous image frame and the received parameterized model description for the current image frame; detecting interruption in a received video signal; and outputting the estimated current image frame in response to the detected interruption in the received video signal.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
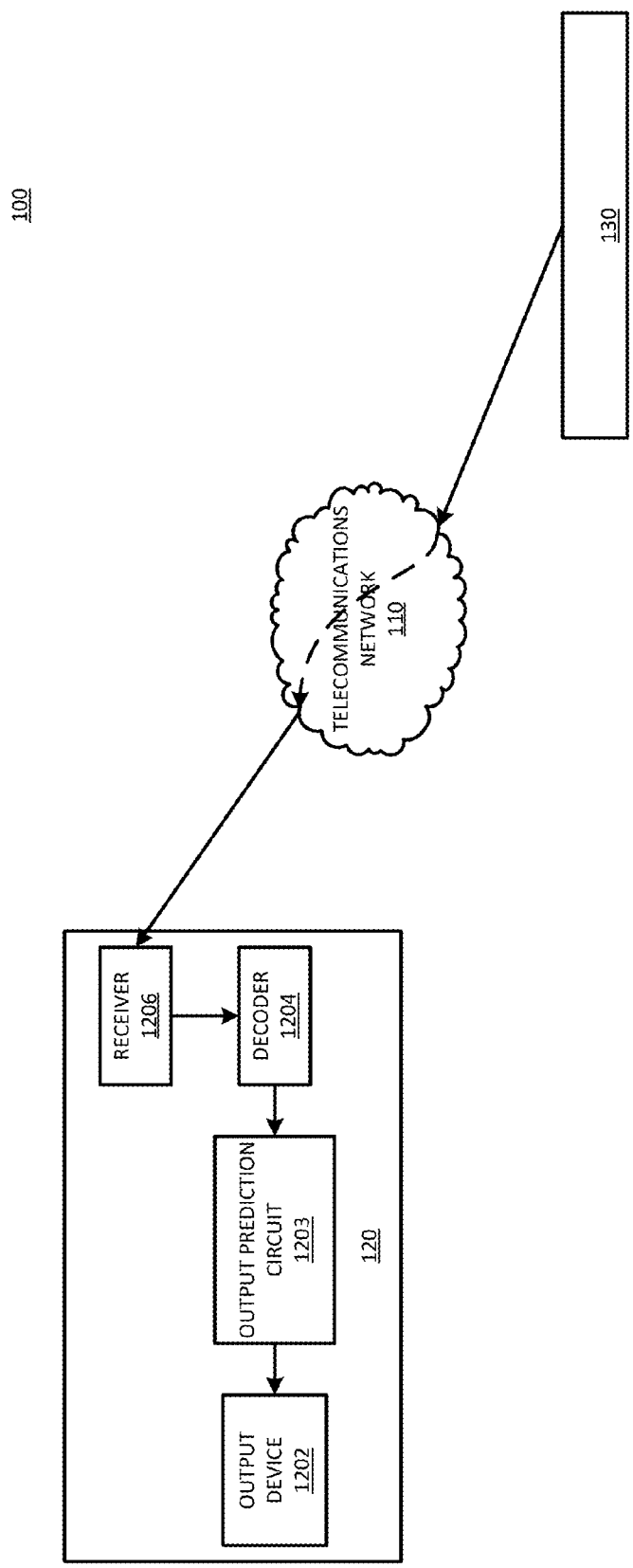
FIG. 1 is a schematic block diagram of a multimedia conferencing infrastructure 100 according to an example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encom-

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using hardware at existing video conferencing systems. Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

In recent years, there have been advances in computer analysis and modeling of the human body. For example, the Microsoft® Kinect camera system generates detailed models of both a subject's face (detecting over 100 facial landmarks) and body position (skeletal joints) in less than a frame time. Additionally, other systems are also available with varying degrees of analysis capability.

While variations of picture element (pel) values (e.g., pixel values) in a video scene may appear limitless, in real-world scenes the number of possibilities of behavior is generally small particularly for shorter periods of time (e.g., from fractions to several seconds depending on the content of the scene). For example, if a face is detected and analyzed, an estimate of the most likely track of the head can be used to predict where the head will move for a relatively short period with reasonable certainty. The conventional "frame repeat" decoder output discussed above, which uses no model-based prediction, essentially predicts that the subject will perform a fast deceleration and remain perfectly stationary, which is highly unlikely in the real-world, followed by a fast jump to another location, which is impossible in the real-world.

Additionally, computer animation has developed to the level that computer generated objects are often indistinguishable from real-life objects. The quality of computer animation is particularly good if the rendering is created from real-world data such as image textures and motion capture. While today's average real-time generated graphics are generally of lesser quality and computer characters mostly fall into the so-called "uncanny valley", their quality is an improvement over today's "do nothing" or "frame repeat" solution, and likely to improve dramatically over time.

Example embodiments leverage this knowledge and advances in computer analysis and animation to provide methods and systems that improve the subjective quality of video under error conditions (e.g., image frame loss, image frame corruption, video signal interruption, etc.) in situations where video data is delivered over one or more computer networks (e.g., during a multimedia conference between two or more multimedia conferencing users, broadcast television (TV), Internet video delivery, etc.).

According to at least one example embodiment, a model of a video scene for a multimedia conference is generated (e.g., continuously generated), and then used to estimate missing sections (e.g., image frames) of the video stream by morphing and/or modifying the available uncorrupted video data based on the model. This method uses higher level interpretations of the content of the video scene than is available to simpler picture element (pel)-based decoders.

According to at least some example embodiments, the model may refer to a model or parameterized model description of an image frame depicting the video scene. The parameterized model description includes model parameters describing position and orientation of objects and/or landmarks in the image frame. In one example, the model parameters include implied three dimensional (3D) coordinates of well-defined body parts such as eye position, head tilt, elbow location, etc., or a higher level description such as mouth shape, etc.

In more detail, according to at least one example embodiment a most recent available image frame for a video scene including a person (e.g., on a one-to-one video call) is analyzed and separated into its semantic components. At its simplest, the image frame may be divided into a "human" (or more generally an "object" portion) and a "background" portion. The background may be assumed to be essentially static, and depending on the application, may not need to be further broken down. The human portion may be further refined into finer objects such as body, arm, hand, finger, head, nose, eye, mouth, etc.

The human portion of the image data (e.g., image pixel data) for the image frame may be used as a texture map for the predicted model, and recomposited onto the background model to provide an estimate of the missing image frame.

Figure 3:
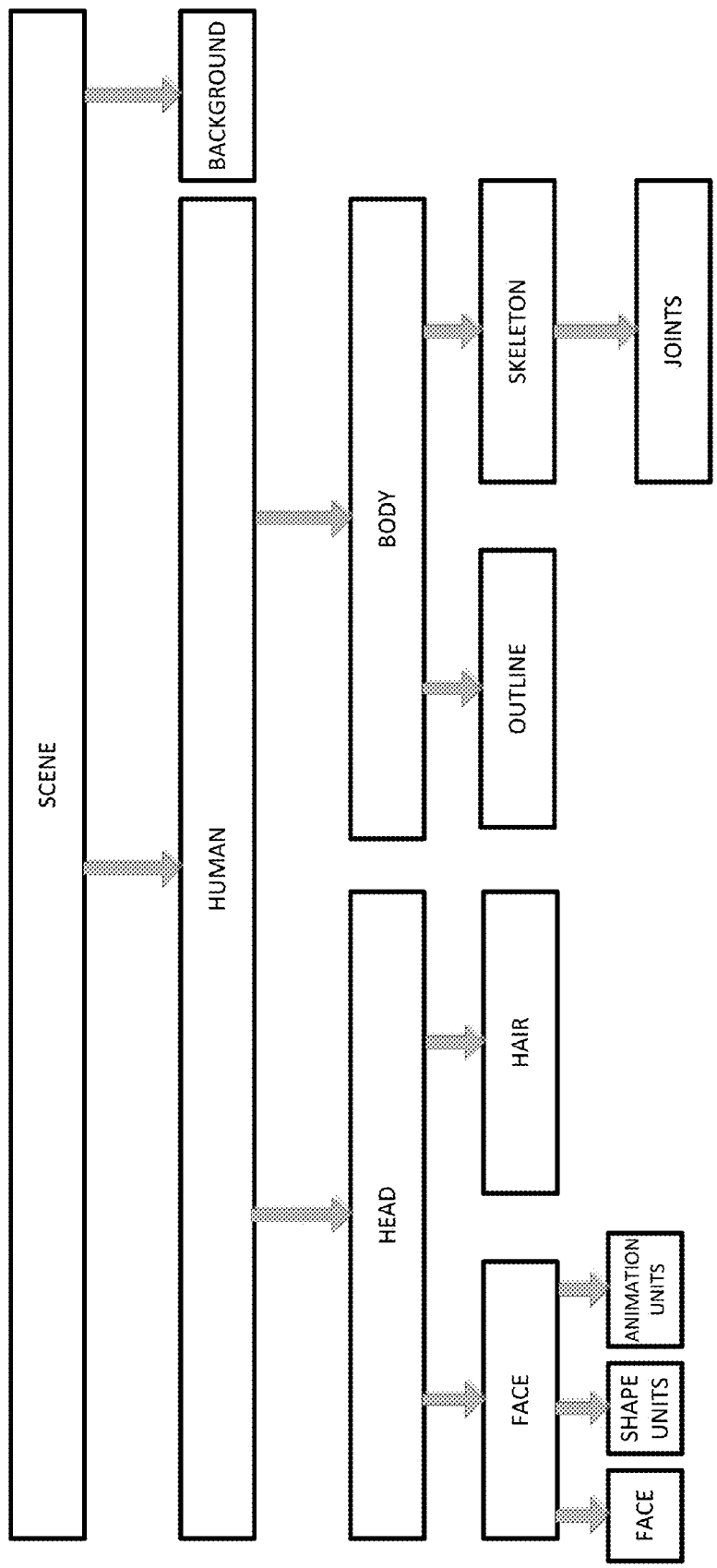
FIG. 3 is an example of a hierarchical semantic description of a video call image frame.

FIG. 3 is an example of a hierarchical semantic description of a video conference image frame.

Referring to FIG. 3, the scene of an image frame can be separated into the human portion and the background portion. The human portion can be further separated into the head portion and the body portion. The head portion can be further broken down into the face portion and the hair portion. The face portion can be refined to identify the face, shape units (SU—the shape of the face) and animation units (AU—the dynamic distortion of the face). Alternatively, the face may be refined as a set of coordinates of well-defined landmarks such as lip corners, chin, etc.

Still referring to FIG. 3, the body portion can be separated into an outline of the body and a skeleton of the body. The skeleton of the body is the further defined by the locations of the joints in the skeleton.

Tracking the positions and orientations of the objects or landmarks (or semantic components) of the video scene over time (e.g., between image frames) through the use of parameterized model descriptions provides short-term information about the ballistic nature of each portion of the body (e.g., hand moving 10 pels/sec to the right, head moving 2 pels/sec to the left, etc.). Tracking these objects or landmarks of the video scene over longer periods (e.g., between multiple successive image frames) may provide information concerning limits of acceleration and location of the objects or landmarks within the video scene.

Using the short term and/or long term tracking of the objects, a heuristic model of the human body is developed and refined continuously. Assumptions about the connectedness of body parts (e.g., hand is attached to arm, etc.) and the range of motion of particular parts of the human body allow the model of the human body to be updated with estimates of the body (e.g., forearm length is 45 cm), and consequently more realistic.

A model for the background may also be developed, refined and expanded as the human object moves within the video scene revealing portions of the video scene that may have been previously obscured.

In the event of a transmission error during the multimedia conference, when one or more image frames is/are not available, the most likely position of the unique objects or landmarks (e.g., body parts) for the missing one or more image frames may be predicted using the model.

Extensions to this concept may include the modeling of additional features within the scene, for example, additional people, lighting, etc. Also, if a future frame is also available, the predicted model may be further refined. For example, both past and future frames may be used to provide bidirectional model prediction.

FIG. 1 is a schematic block diagram of a multimedia conferencing infrastructure 100 according to an example embodiment. The multimedia conferencing infrastructure may also be referred to as a video delivery system. Although example embodiments will be described with regard to a multimedia conferencing infrastructure, example embodiments may also be applied to other areas of technology, such as broadcast television (TV), Internet video delivery, etc.

Referring to FIG. 1, the multimedia conferencing infrastructure 100 includes multimedia conferencing terminals (also referred to herein as multimedia transceiver terminals or multimedia transceiver apparatuses) 120 and 130 that communicate via telecommunications network 110.

While participating in a multimedia conference (or conference call), the multimedia conferencing terminals 120 and 130 transmit/receive multimedia conference traffic to/from one another. Each multimedia conferencing terminal is operated by and enables a respective end-user to participate in a multimedia (e.g., video and/or audio) conference. As discussed herein, multimedia traffic may include video traffic, audio and video traffic, etc., but is not limited thereto.

The multimedia conferencing terminals 120 and 130 may be various devices (both wired and wireless) capable of being used to conduct and/or participate in a multimedia conference via one or more telecommunications networks. For example, the multimedia conferencing terminals 120 and 130 may be mobile devices (e.g., mobile phone, smartphone, personal digital assistant (PDA), etc.) capable of accessing a multimedia conference via a wireless network (e.g., a 3rd Generation (3G) or 4th Generation (4G) wireless network), computers capable of accessing a multimedia conference via a wired or wireless local area network (LAN), an Internet television (or other device) capable of accessing a multimedia conference via a cable network, a portable or laptop computer (e.g., a laptop, netbook, tablet, etc.) capable of accessing a multimedia conference via a WiFi (or other wireless) network, etc. Although these devices are discussed as accessing particular networks, many of these devices are capable of accessing multiple networks. For example, mobile devices and portable computers (e.g., laptops, netbooks, tablets, etc.) are very often able to access WiFi networks, 3G or 4G networks and/or LANs. It will be understood that the multimedia conferencing terminals 120 and 130 shown in FIG. 1 may participate in multimedia conferences via access networks different from those specifically discussed herein. Thus, example embodiments should not be limited to the particular access network/end-user device combinations discussed herein. Moreover, it will be understood that the multimedia conferencing terminals 120 and 130 may participate in multimedia conferences by accessing multiple different access networks concurrently and/or simultaneously. In one example, the multimedia conferencing terminals 120 and 130 may spread multimedia data over multiple access networks to achieve load balancing.

For example purposes, the multimedia conferencing terminals 120 and 130 may be discussed as computer devices such as laptop or tablet computers. However, example embodiments should not be limited to this example.

Still referring to FIG. 1, for example purposes, the multimedia conferencing terminal 130 will be described as the transmitter of video content during a video conference between the multimedia conferencing terminals 120 and 130, whereas the multimedia conferencing terminal 120 will be described as the receiver of video content during the video conference. It should be understood, however, that each of the multimedia conferencing terminals 120 and 130 include the same or similar components.

As shown in FIG. 1, the multimedia conferencing terminal 120 includes: a receiver 1206; a decoder 1204; an output prediction circuit 1203; and an output device 1202.

In one example, the output device 1202 includes components for outputting received video content (video stream) to the user. In one example, the output device 1202 may include a display screen, speakers, etc.

At the multimedia conferencing terminal 120, the receiver 1206 processes received video data from the multimedia conferencing terminal 130, and outputs the processed video data to the decoder 1204. In one example, if the video data is received via wireless transmission, then the receiver 1206 converts the received radio signal into encoded video data to be decoded by the decoder 1204. Because methods for processing received video data are well-known, a detailed discussion is omitted.

The decoder 1204 decodes the received video data to generate a video stream including a stream of image frames (also sometimes referred to as video content). The decoder 1204 outputs the decoded image frames in order to the output prediction circuit 1203. Because methods for decoding received video data are well-known, a detailed discussion is omitted.

The output prediction circuit 1203 generates, and then continuously updates, a model of the video scene associated with the received video data based on decoded image frames from the decoder 1204. When uncorrupted image frames are received, the output prediction circuit 1203 uses the uncorrupted image frames to update the model of the video scene. The output prediction circuit 1203 is then able to use the model to generate an estimate of a next image frame of the video stream by morphing and/or modifying the available uncorrupted video data (e.g., a current or previous image frame).

When the output prediction circuit 1203 detects signal loss (e.g., one or more missing image frames in the video stream), the output prediction circuit 1203 outputs the estimated image frame(s) to the output device 1202. Otherwise, the output prediction circuit 1203 outputs the image frames received from the decoder 1204 to the output device 1202 in order (e.g., first-in-first-out (FIFO)). The output prediction circuit 1203 will be discussed in more detail later with regard to FIGS. 2 and 3. The output prediction circuit 1203 may continue to output the estimate image frames until the output prediction circuit 1203 no longer detects video signal loss.

The output device 1202 displays the received image frames to the multimedia conference user.

Figure 2:
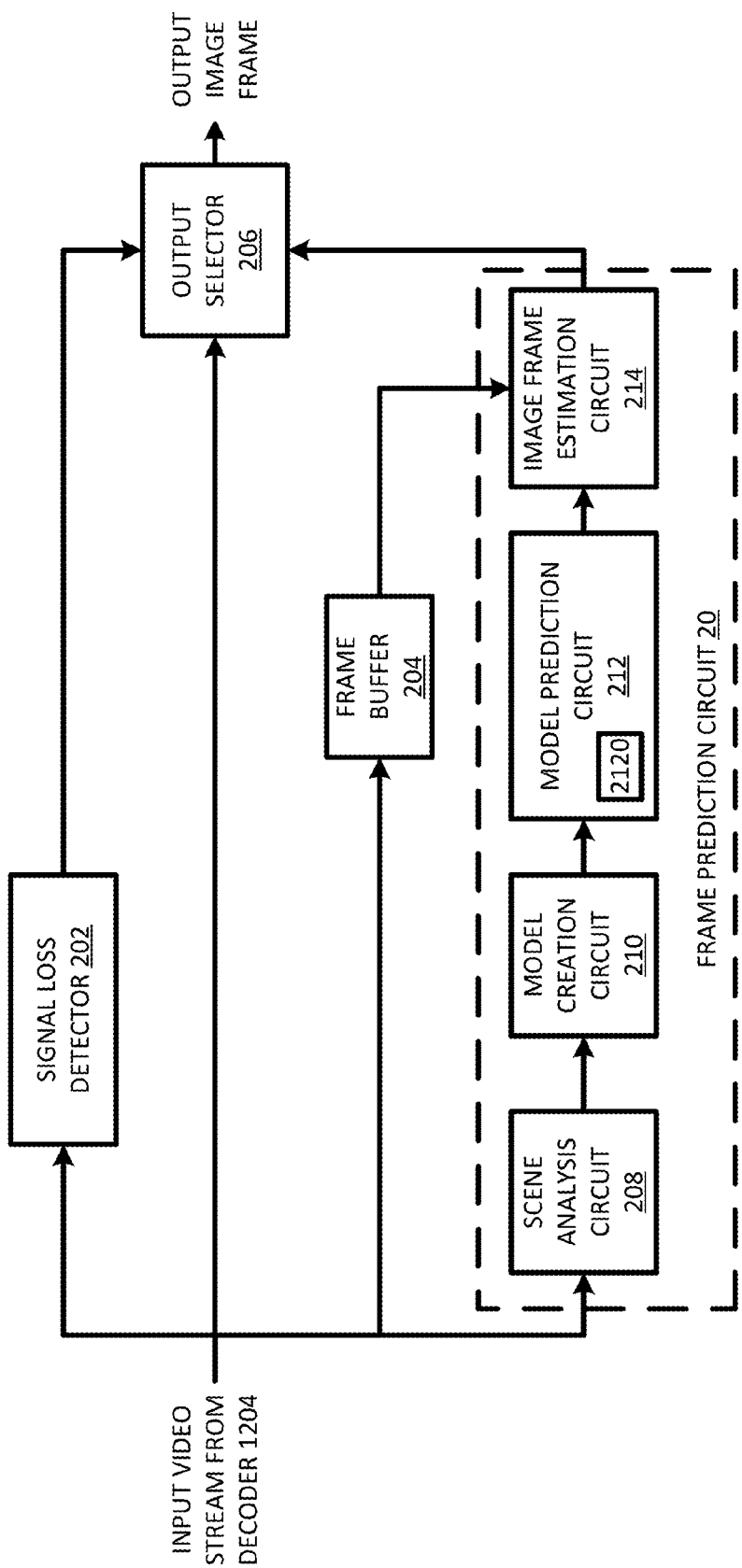
FIG. 2 is a block diagram illustrating an example embodiment of the output prediction circuit 1203 shown in FIG. 1.

FIG. 2 is a block diagram illustrating an example embodiment of the output prediction circuit 1203 shown in FIG. 1. Example functionality of the output prediction circuit 1203 will be described, in most instances, with regard to an i-th and (i+1)th image frame (also sometimes referred to herein as a video frame) in a video stream including a sequence of N image frames, where $i=1, 2, 3, \ldots, N$. However, it should be understood that the same or similar operations may be performed on each of the decoded image frames from the decoder 1204.

Referring to FIG. 2, the output prediction circuit 1203 includes: a signal loss detector 202; a frame buffer 204; a frame prediction circuit 20; and an output selector 206. The frame prediction circuit 20 includes: a scene analysis circuit 208; a model creation circuit 210; a model prediction circuit 212; and an image frame estimation circuit 214. The model prediction circuit 212 includes a memory 2120 to store parameterized model descriptions of decoded image frames.

The signal loss detector 202 continuously monitors the video stream from the decoder 1204 to determine whether the video signal has been interrupted. In one example, the signal loss detector 202 determines that the video signal has been interrupted if at least one image frame in the video stream from the decoder 1204 is missing or corrupted. Alternatively, the decoder 1204 may detect that a section of the compressed video data is missing or corrupted, and send a notification signal to the signal loss detector 202.

When the signal loss detector 202 detects an interruption in the video signal, the signal loss detector 202 outputs a signal loss indicator signal to the output selector 206. The signal loss indicator signal may be in the form of a flag bit, which is set when the signal loss detector 202 detects interruption in the video signal. When the signal loss detector 202 no longer detects interruption in the video signal the flag bit may be reset. The signal loss detector 202 may continue to output the set flag bit indicating interruption of the video signal until the signal loss detector 202 no longer detects interruption in the video signal.

The frame buffer 204 buffers the image frames from the decoder 1204, and outputs the buffered image frames to the image frame estimation circuit 214. According to example embodiments, for forward prediction the frame buffer 204 may be at least large enough to hold the most recent (last) correctly decoded image frame. Alternatively, for bidirectional prediction the frame buffer 204 is at least large enough to hold the most recent correctly decoded image frame and the next correctly decoded frame.

The frame prediction circuit 20 continuously generates a model of the video scene based on decoded image frames from the decoder 1204. Using the generated model, the frame prediction circuit 20 generates an estimate of one or more (e.g., each) subsequent image frames of the video stream by morphing and/or modifying available uncorrupted image frames (e.g., a current or most recent uncorrupted image frame). The estimated subsequent image frames are sequentially output to the output selector 206. When the signal loss detector 202 detects interruption of the video signal, the output selector 206 outputs the estimated image frame to the output device 1202. Otherwise, the output selector 206 outputs image frames received from the decoder 1204 to the output device 1202 in order. The output selector 206 may be implemented as a multiplexer or any similar selection device.

In one example, the frame prediction circuit 20 generates an estimate of a subsequent (i+1)th image frame of the video stream by morphing the available uncorrupted i-th image frame using the generated model of the video scene. The estimated (i+1)th image frame is output to the output selector 206. If the signal loss detector 202 detects that the (i+1)th image frame is missing or corrupted, then the output selector 206 outputs the estimated (i+1)th image frame to the output device 1202.

A more detailed example operation of the frame prediction circuit 20 will now be described.

In more detail with regard to FIG. 2, the scene analysis circuit 208 segments the i-th image frame into a background portion and human portion, and then detects unique objects within the human portion of the i-th image frame. In this example, the unique objects (also referred to or including landmarks) within the human portion may include a face and body of the user, objects held by the user, objects in the foreground of the image frame, etc.

In one example, the scene analysis circuit 208 segments the i-th image frame and detects unique objects within the human portion by analyzing pixel values of the i-th image frame and grouping similar pixels into clusters using combinations of operations such as thresholding, clustering, edge detection or using a watershed transform. In another example, the scene analysis circuit 208 may utilize feature/object detection methods such as Haar cascade classifiers, which provide an initial estimate of the presence of unique objects in an image frame. Because these scene analysis and feature/object detection methodologies are generally well-known, a detailed discussion is omitted.

Still referring to FIG. 2, when detecting unique objects within the human portion of the i-th image frame, the scene analysis circuit 208 obtains unique object information for the i-th image frame. The unique object information for the i-th image frame may include position information (e.g., pixel position information) regarding the detected unique objects within the video scene. The scene analysis circuit 208 outputs the unique object information as well as the i-th image frame to the model creation circuit 210.

The model creation circuit 210 generates a parameterized model description for the i-th image frame based on the unique object information and the i-th image frame from the scene analysis circuit 208. As mentioned above, the parameterized model description for the i-th image frame includes model parameters describing the location (or position) and orientation of (e.g., all) individual parts of the human portion of the i-th image frame.

The model creation circuit 210 may extract the parameterized model description in any well-known manner. For example, the model creation circuit 210 may extract the parameterized model description using a body tracking algorithm, such as that used in the Microsoft Kinect® sensor. In this example, the depth information of the scene is analyzed to estimate a pose of the human body matching the input depth images against a training set of thousands of images, and creating an estimate of the 3D location and orientation of up to 20 joints using a randomized decision forest classifier. A more detailed explanation of methods for extracting parameterized model description may be found, for example, in an article entitled "Real-Time Human Pose Recognition in Parts from Single Depth Images," by J. Shotton, et al., in Communications of the ACM, Volume 56, Issue 1, January 2013, pages 116-124.

To extract a parameterized model description of the face, the model creation circuit 210 may use face recognition in which human faces are detected and features located. In this case, the model creation circuit 210 outputs an estimate of the 3D head pose (including location and orientation) together with 11 shape unit (SU—the shape of the face) and 6 animation unit (AU—the dynamic distortion of the face) descriptions of the face model as defined, for example, in the Candide3 face model, which is well-known.

In another example, the model creation circuit 210 may extract a parameterized model description of the face using methods described in the article by Z. Cao, et al., entitled "Face Recognition with Learning-based Descriptors," presented at the 2010 IEEE Conference on Computer Vision and Pattern Recognition (CVPR) between June 13 and Jun. 18, 2010. Other methods for face recognition may also be used.

According to at least some example embodiments, model parameters of a parameterized model description describe the state of the available model components such as head location and pose. Additionally, depending on the face model used, the model parameters describe either face shape parameters and action unit parameters, or 3D locations of facial landmarks such as eye corners, eye centers, lip edges, chin point, etc. Example face shape parameters and action unit parameters are shown below.

| EXAMPLE FACE SHAPE PARAMETERS | |
|---|---|
| SU Name | SU number in Candide-3 |
| Head height | 0 |
| Eyebrows vertical position | 1 |
| Eyes vertical position | 2 |
| Eyes, width | 3 |
| Eyes, height | 4 |
| Eye separation distance | 5 |
| Nose vertical position | 8 |
| Mouth vertical position | 10 |
| Mouth width | 11 |
| Eyes vertical difference | n/a |
| Chin width | n/a |

| EXAMPLE ACTION UNIT PARAMETERS |
|---|
| AU0 - Upper Lip Raiser |
| AU1 - Jaw Lowerer |
| AU2 - Lip Stretcher |

-continued

EXAMPLE ACTION UNIT PARAMETERS

AU3 - Brow Lowerer
AU4 - Lip Corner Depressor
AU5 - Outer Brow Raiser

The model parameters may also describe two-dimensional (2D) locations of the same facial landmarks relative to the pixels of the image.

The model creation circuit 210 outputs the parameterized model description of the i-th image frame to the model prediction circuit 212.

The model prediction circuit 212 receives the parameterized model description of the i-th image frame, and generates (or predicts) a parameterized model description for the (i+1)th based on the parameterized model description for the i-th image frame as well as parameterized model descriptions for other previous frames (e.g., (i−1)th image frame, (i−2)th image frame, etc.) stored in the memory 2120 at the model prediction circuit 212. In other words, the model prediction circuit 212 predicts parameters of a parameterized model description for the (i+1)th image frame based the parameterized model descriptions of past (or previous) image frames. The parameterized model description for the (i+1)th image frame includes predicted position and orientation information for objects in the (i+1)th image frame.

The model prediction circuit 212 may also take into account future image frames stored at the frame buffer 204 when generating the parameterized model descriptions. In addition, the estimated parameters may be refined by examining (e.g., parameterized model descriptions of) future image frames (e.g., the (i+1)th image frame, etc.) if such an image frame is received and uncorrupted.

By estimating the parameters of the model, the frame prediction circuit 20 is able to predict movement of the objects in the (i+1)th image frame as well as other future image frames.

In one example, the model prediction circuit 212 may estimate parameters based on information from the i-th and (i−1)th image frames in which a linear estimate of the parameter is obtained by simple extrapolation from the two image frames. For example, if the x-location of the face is at position P1 in the (i−1)th image frame and at position P2 in the i-th image frame, then the model prediction circuit 212 determines that the face will be at position P3 in the (i+1)th frame through simple extrapolation. In other words, if the x-location of the face is position P1 at time t1, and position P2 at time t2, then the model prediction circuit 212 may extrapolate that the face will be at position P3 at time t3. Because methods for extrapolation are well-known, a detailed discussion is omitted for the sake of brevity. The model prediction circuit 212 may utilize more complex predictions if further information regarding the particular object or landmark being modeled is available.

For example, if parameters for additional (e.g., previous) image frames are available, the model prediction circuit 212 may generate a more complex model of the motion of an object (e.g., the face, the head, the hand, etc.). Another example of additional information is the knowledge, for example, that there are limits to distortions of certain objects. In one example, the model prediction circuit 212 may take into account the limitations in the distortion of facial features in the Candide3 face models (e.g., a mouth distortion limited to within the defined region), the bend range of elbow, the bend range of the knee, etc. The model prediction circuit 212 outputs the generated parameterized model description to the image frame estimation circuit 214.

Still referring to FIG. 2, the image frame estimation circuit 214 generates the (i+1)th image frame based on the predicted model parameters (or predicted parameterized model description) from the model prediction circuit 212 and at least the i-th image frame from the frame buffer 204. More generally, the image frame estimation circuit 214 generates a subsequent or next image frame based on the predicted model parameters from the model prediction circuit 212 and at least the current image frame from the frame buffer 204.

According to at least one example embodiment, the image frame estimation circuit 214 may utilize a non-linear image construction morpher to generate an estimate of a missing or corrupted image frame (e.g., the (i+1)th image frame in the above-mentioned example).

In more detail with regard to the i-th and (i+1)th image frames discussed above, the image frame estimation circuit 214 determines a difference between locations of objects such as key facial landmarks in the i-th image frame as compared to the model of the (i+1)th image frame, and estimates the (i+1)th image frame based on the determined difference information. In one example, the image frame estimation circuit 214 estimates the (i+1)th image frame via a 'warping' (texture mapping) operation that creates a set of estimated pel locations corresponding to triangular regions defined by current facial landmarks. As is known in the art, the 'warping' operation is conventionally used in texture mapping of computer graphics where a source image is distorted to represent the surface of an object. The operation is defined by starting and ending triangular regions, and is often represented as a matrix transformation corresponding to a two-dimensional skew together with a two-dimensional translation.

In the above-discussed example, the morpher at the image frame estimation circuit 214 uses model parameters for the (i+1)th image frame along with model parameters for the i-th image frame together with image frame data (e.g., color information) for the i-th image frame to generate the estimate of the (i+1)th image frame.

The image frame estimation circuit 214 outputs the estimated (i+1)th frame to the output selector 206.

Based on the signal loss indicator signal from the signal loss detector 202, the output selector 206 outputs one of the (i+1)th image frame from the decoder 1204 and the estimated (i+1)th image frame from the image frame estimation circuit 214. As mentioned above, the signal loss detector 202 outputs the signal loss indicator signal when the signal loss detector 202 detects an interruption in the video signal (e.g., one or more missing image frames in the video stream) from the decoder 1204.

Example embodiments are discussed above with regard to the frame prediction circuit 20 being located at a receiving multimedia conferencing terminal. In this case, the analysis, model creation, model prediction and image frame estimation are co-located with the playback system at a receiver. However, according to the resources, capabilities and/or needs of the system, the analysis and generation of the parameterized model description may be performed at the origination point of the media (e.g., at the camera or computer device coupled to the camera) or at a "cloud" server (e.g., a multimedia conferencing server) in a networked system, and the resulting analysis information (e.g., parameterized model descriptions) transmitted to the receiving multimedia conferencing terminal via a higher quality network path, thereby allowing modeling information to be available even when compressed video data is not. This enables the model prediction to be based on actual data instead of interpolated or extrapolated data. According to at least some example embodiments, the origination point of the media (e.g., transmitting multimedia conferencing or apparatus, multimedia transceiver apparatus, multimedia server, multimedia conferencing server, cloud server, etc.) may be more generally referred to as a video delivery apparatus (or device), video generation apparatus (or device), multimedia content delivery apparatus (or device), multimedia transceiver apparatus (or device), etc. Moreover, as discussed herein, the term apparatus may refer to a terminal or a server.

Figure 4:
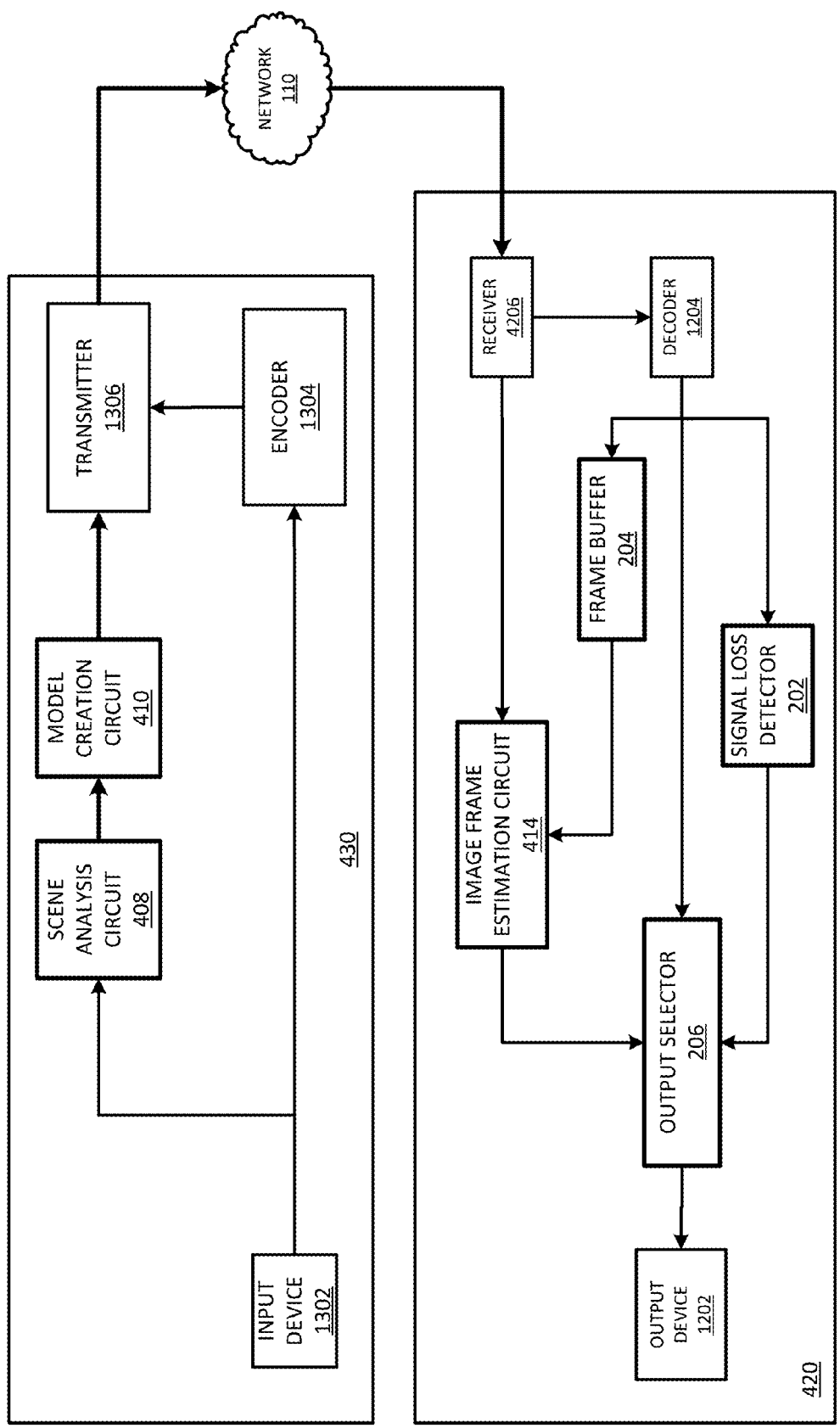
FIG. 4 is a block diagram illustrating another example embodiment of a multimedia conferencing infrastructure.

FIG. 4 is a block diagram illustrating another example embodiment of a multimedia conferencing infrastructure (or video delivery system). In at least this example embodiment, a parameterized model description for each image frame is generated at the transmitting multimedia conferencing terminal 430 and transmitted to the receiving multimedia conferencing terminal 420 over a more reliable higher quality network path or link. At the receiving multimedia conferencing terminal 420, image frames are estimated based on the received parameterized model description, rather than based on model parameters predicted at the receiving multimedia conferencing terminal 420 as in the example embodiment shown in FIGS. 1 and 2. Although the multimedia conferencing terminals are discussed as transmitting and receiving terminals, it should be understood that each of the multimedia conferencing terminals 420 and 430 include the same or similar components.

Moreover, although the example embodiment shown in FIG. 4 will be described with regard to multimedia conferencing terminals, it should be understood that some or all of the functionality performed at the multimedia conferencing terminal 430 may alternatively be performed at a cloud server. In this case, for example, the multimedia conferencing terminal 430 may be a multimedia server or the like. As discussed herein, an origination point for the video data (e.g., multimedia conferencing terminal, multimedia server or cloud server, etc.) may be referred to as a video delivery device, video delivery apparatus, multimedia transceiver apparatus, etc.

As is the case with FIG. 2, the example embodiment shown in FIG. 4 will be described with regard to an i-th image frame in a video stream including a sequence of N image frames, where i=1, 2, 3, ..., N. However, it should be understood that the same or similar operations may be performed on each of the image frames in the video stream.

Referring to FIG. 4, the transmitting multimedia conferencing terminal 430 includes: an input device 1302; an encoder 1304; a scene analysis circuit 408; a model creation circuit 410; and a transmitter 1306.

The input device 1302 obtains or captures the i-th image frame of a video stream to be transmitted to the receiving multimedia conferencing terminal 420. In one example, the input device 1302 may be a video camera. The input device 1302 outputs the i-th image frame to the scene analysis circuit 408 and the encoder 1304.

The encoder 1304 encodes the i-th image frame to generate video data for transmission to the multimedia conferencing terminal 420. The encoder 1304 outputs the encoded video data to the transmitter 1306. Because methods for encoding a video stream are well-known, a detailed discussion is omitted.

The scene analysis circuit 408 generates unique object information for the i-th image frame in the same manner as the scene analysis circuit 208 discussed above with regard to FIG. 2. The scene analysis circuit 408 outputs the unique object information for the i-th image frame to the model creation circuit 410.

In the same manner as the model creation circuit 210, the model creation circuit 410 generates a parameterized model description for the i-th image frame. The model creation circuit 410 outputs the parameterized model description for the i-th image frame to the transmitter 1306.

The transmitter 1306 processes received encoded video data and the parameterized model description for the i-th image frame for transmission to the multimedia conferencing terminal 420, and transmits the encoded video data and the parameterized model description to the multimedia conferencing terminal 420 via network 110. In one example, if the video data and the parameterized model description are being transmitted via wireless transmission, then the receiver 1206 converts the encoded video data and the parameterized model description into radio signals to be transmitted to the multimedia conferencing terminal 420. In one example, the parameterized model description may be transmitted over a more reliable higher quality network path or link (e.g., by source setting the diffsery (DS) field in IP packets, utilizing a higher quality of service for wireless communications, such as 3GPP LTE, etc.) between the multimedia conferencing terminals.

Still referring to FIG. 4, the multimedia conferencing terminal 420 includes: a receiver 4206; a decoder 1204; a frame buffer 204; an image frame estimation circuit 414; an output selector 206; a signal loss detector 202 and an output device 1202. Each of the decoder 1204, the signal loss detector 202, the frame buffer 204, the output selector 206; and the output device 1202 are the same as those discussed above with regard to FIG. 2, and thus, will not be described in detail here. The receiver 4206 and the image frame estimation circuit 414 are similar to the receiver 1206 and the image frame estimation circuit 214 discussed above with regard to FIG. 2, and thus, only differences between the example embodiments will be discussed for the sake of brevity.

At the multimedia conferencing terminal 420, the receiver 4206 receives the video data and parameterized model description from the multimedia conferencing terminal 430. The receiver 4206 processes received video data from the multimedia conferencing terminal 430 and outputs the processed video data to the decoder 1204. In addition, the receiver 4206 processes the received parameterized model description for the i-th image frame. The receiver 4206 outputs the parameterized model description for the i-th image frame to the image frame estimation circuit 414. The receiver 1206 processes the video data and the parameterized model description in the same manner as discussed above with regard to FIG. 2.

The decoder 1204 decodes the received video data to generate the i-th image frame. The decoder 1204 outputs the decoded i-th image frame to the output selector 206, the frame buffer 204, and the signal loss detector 202 as discussed above with regard to FIG. 2.

The image frame estimation circuit 414 generates an estimate of the i-th image frame based on the parameterized model description for the i-th image frame from the receiver 4206 and at least the (i−1)-th image frame previously stored at the frame buffer 204 in the same manner as discussed above with regard to the image frame estimation circuit 214 shown in FIG. 2. The image frame estimation circuit 414 outputs the estimated i-th image frame to the output selector 206.

The signal loss detector 202 continuously monitors the video stream from the decoder 1204 to determine whether the video signal has been interrupted. If the signal loss detector 202 detects that, for example, the i-th image frame is missing or corrupted, then the signal loss detector 202 outputs a signal loss indicator signal to the output selector 206.

In response to the signal loss indicator signal from the signal loss detector 202, the output selector 206 outputs the estimated i-th image frame to the output device 1202.

Unlike the example embodiment shown in FIG. 2, the example embodiment shown in FIG. 4 does not require the model prediction circuit. Moreover, the image frame estimation circuit 414 generates estimated image frames based on actual model parameters, rather than predicted model parameters as is the case with the example embodiment shown in FIG. 2.

During a video conference between two or more video conferencing users, data errors in compressed video typically result in loss of decoded image frames, which is undesirable to the end user. Example embodiments provide methods and systems that improve the subjective quality of video under error conditions (e.g., image frame loss, image frame corruption, video signal interruption, etc.). One or more example embodiments also provide methods and systems capable of suppressing freezes and/to jerkiness during video conferences between users over one or more networks.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A multimedia transceiver apparatus comprising:
   a frame prediction circuit configured to,
      generate a parameterized model description for each of a plurality of image frames in a sequence of image frames of a video scene, the plurality of image frames including at least a current image frame and a previous image frame, and the parameterized model description including position and orientation information for objects in an image frame;
      predict a parameterized model description for a subsequent image frame in the sequence of image frames based on the parameterized model descriptions for the plurality of image frames, and
      estimate the subsequent image frame based on the current image frame and the predicted parameterized model description for the subsequent image frame;
   a signal loss detector configured to detect an interruption in a received video signal; and
   an output selector configured to output the estimated subsequent image frame in response to the detected interruption in the received video signal.

2. The multimedia transceiver apparatus of claim 1, wherein the frame prediction circuit comprises:
   a scene analysis circuit configured to,
      separate the current image frame into an object portion and a background portion,
      detect unique objects within the object portion of the current image frame, and
      generate unique object information for the current image frame based on the detected unique objects within the object portion, the unique object information including position information for the detected unique objects; and wherein
   the frame prediction circuit is configured to generate the parameterized model description for the current image frame based on the unique object information.

3. The multimedia transceiver apparatus of claim 1, wherein the frame prediction circuit is configured to predict the parameterized model description for the subsequent image frame using one of forward prediction and bidirectional prediction.

4. The multimedia transceiver apparatus of claim 1, wherein the frame prediction circuit further comprises:
   an image frame estimation circuit configured to,
      determine a difference between positions of objects in the current image frame and predicted positions of objects identified in the parameterized model description of the subsequent image frame, and
      estimate the subsequent image frame based on the determined difference.

5. The multimedia transceiver apparatus of claim 4, wherein the frame prediction circuit further comprises:
   a frame buffer configured to buffer the current image frame, and to output the current image frame to the image frame estimation circuit.

6. The multimedia transceiver apparatus of claim 1, further comprising:
   an output device configured to output the estimated subsequent image frame to a user.

7. The multimedia transceiver apparatus of claim 1, wherein the signal loss detector is configured to detect interruption in the received video signal if the subsequent image frame is missing or corrupted in the sequence of image frames.

8. The multimedia transceiver apparatus of claim 1, wherein the output selector is configured to output the subsequent image frame if the signal loss detector does not detect interruption in the received video signal.

9. The multimedia transceiver apparatus of claim 1, wherein the objects in the image frame include at least one of body and facial landmarks in a human portion of the image frame.

10. The multimedia transceiver apparatus of claim 1, wherein the multimedia transceiver apparatus is a multimedia server.

11. A multimedia transceiver apparatus comprising:
   a model creation circuit configured to generate a parameterized model description for a current image frame in a sequence of image frames of a video scene, the parameterized model description including position and orientation information for objects in the current image frame;
   an encoder configured to encode the current image frame for transmission; and
   a transmitter configured to transmit the encoded current image frame and the parameterized model description for the current image frame.

12. The multimedia transceiver apparatus of claim 11, further comprising:
   a scene analysis circuit configured to,
      separate the current image frame into an object portion and a background portion,
      detect unique objects within the object portion of the current image frame, and
      generate unique object information for the current image frame based on the detected unique objects within the object portion, the unique object information including position information for the detected unique objects; and wherein the model creation circuit is configured to generate the parameterized model description for the current image frame based on the unique object information.

13. The multimedia transceiver apparatus of claim 11, wherein the objects in the current image frame include at least one of body and facial landmarks in a human portion of the current image frame.

14. The multimedia transceiver apparatus of claim 11, wherein the multimedia transceiver apparatus is a multimedia server.

15. A multimedia transceiver apparatus comprising:
an image frame estimation circuit configured to,
receive a parameterized model description for a current image frame in a sequence of image frames of a video scene, the parameterized model description including position and orientation information for objects in the current image frame, and
estimate the current image frame based on a previous image frame and the received parameterized model description for the current image frame;
a signal loss detector configured to detect interruption in a received video signal; and
an output selector configured to output the estimated current image frame in response to the detected interruption in the received video signal.

16. The multimedia transceiver apparatus of claim 15, wherein the image frame estimation circuit is further configured to,
determine a difference between positions of objects in the previous image frame and predicted positions of objects identified in the parameterized model description of the current image frame, and
estimate the current image frame based on the determined difference.

17. The multimedia transceiver apparatus of claim 15, further comprising:
an output device configured to output the estimated current image frame to a user.

18. The multimedia transceiver apparatus of claim 15, wherein the signal loss detector is configured to detect interruption in the received video signal if the current image frame is missing or corrupted in the sequence of image frames.

19. The multimedia transceiver apparatus of claim 15, wherein the output selector is configured to output the current image frame if the signal loss detector does not detect interruption in the received video signal.

20. The multimedia transceiver apparatus of claim 15, wherein the objects in the current image frame include at least one of body and facial landmarks in a human portion of the current image frame.

* * * * *